(12) United States Patent
Becker et al.

(10) Patent No.: US 12,360,441 B2
(45) Date of Patent: Jul. 15, 2025

(54) MAGNETIC CAMERA MOUNT ARRANGEMENT

(71) Applicant: Pro-Vision Solutions, LLC, Byron Center, MI (US)

(72) Inventors: Scott Joseph Becker, Otsego, MI (US); Matthew Thomas Lehnert, Byron Center, MI (US)

(73) Assignee: PRO-VISION SOLUTIONS, LLC, Byron Center, MI (US)

( * ) Notice: Subject to any disclaimer, the term of this patent is extended or adjusted under 35 U.S.C. 154(b) by 241 days.

(21) Appl. No.: 18/208,060

(22) Filed: Jun. 9, 2023

(65) Prior Publication Data
US 2024/0411211 A1 Dec. 12, 2024

(51) Int. Cl.
*G03B 17/56* (2021.01)
*F16M 11/04* (2006.01)
*F16M 13/04* (2006.01)

(52) U.S. Cl.
CPC ......... *G03B 17/561* (2013.01); *F16M 11/041* (2013.01); *F16M 13/04* (2013.01)

(58) Field of Classification Search
CPC .. G03B 17/561; G03B 17/566; F16M 11/041; F16M 13/04; F16M 11/16
See application file for complete search history.

(56) References Cited

U.S. PATENT DOCUMENTS

| | | |
|---|---|---|
| 10,141,092 B2 | 11/2018 | Bennett |
| 10,480,711 B1 | 11/2019 | Tran et al. |
| 10,980,304 B2 * | 4/2021 | Volmer ................... F21L 4/04 |
| 11,942,978 B1 * | 3/2024 | Felger .................. F16M 13/04 |
| 12,088,333 B2 * | 9/2024 | Dill ...................... H04B 1/3888 |
| 2018/0325247 A1 | 11/2018 | Vlassis et al. |
| 2022/0042643 A1 | 2/2022 | Rasmussen et al. |
| 2022/0112909 A1 | 4/2022 | Fleming et al. |

* cited by examiner

*Primary Examiner* — Mekonnen D Dagnew
(74) *Attorney, Agent, or Firm* — Price Heneveld LLP

(57) ABSTRACT

A wearable portable camera assembly includes an inner bracket and an outer bracket that can be magnetically coupled to the inner bracket through a layer of material. A portable camera is releasably connected to the outer bracket. The portable camera assembly further includes a retainer that resists or prevents detachment of the portable camera from the outer bracket when the outer bracket is magnetically coupled to the inner bracket, but not when the outer bracket is not magnetically coupled to the inner bracket.

16 Claims, 10 Drawing Sheets

MAGNETIC CAMERA MOUNT ARRANGEMENT

BACKGROUND OF THE INVENTION

Various types of wearable cameras have been developed. The cameras may be retained to a user's clothing or other item utilizing brackets or other connectors. One type of connecting arrangement includes inner and outer brackets that magnetically couple to one another through a layer of fabric or other such material. An inner bracket may be positioned inside a shirt pocket, and an outer bracket may then be positioned directly adjacent the inner bracket on the outer side of the pocket. The magnets clamp together due to the magnetic force such that the outer bracket is positioned on an outer side of the pocket. A portable camera may be secured to the outer bracket whereby videos can be taken while an individual is performing other activities. Because the camera is secured to the persons clothing, both hands of the user may be free to conduct other activities.

SUMMARY OF THE INVENTION

An aspect of the present disclosure is a wearable portable camera assembly including an inner bracket and an outer bracket that can be magnetically coupled to the inner bracket through a layer of material. A portable camera is releasably connected to the outer bracket. The portable camera assembly further includes a retainer that resists or prevents detachment of the portable camera from the outer bracket when the outer bracket is magnetically coupled to the inner bracket. The retainer permits detachment of the portable camera from the outer bracket when the outer bracket is not magnetically coupled to the inner bracket.

Another aspect of the present disclosure is a wearable portable camera assembly including a portable camera that is adapted to be worn by a person. The camera assembly further includes an inner bracket member. The inner bracket member is optionally configured to fit into a pocket of an article of clothing. The camera assembly further includes an outer bracket member that is magnetically attached to the inner bracket member such that, in use, the outer bracket member can be retained on an outside of an item (e.g. an article of clothing), by a magnetic force acting through a layer of material when the outer bracket member is in an attached position relative to the inner bracket member. A selected one of the portable camera and the outer bracket member includes a movable retaining member that is movable between an engaged position and a disengaged position. The portable camera is configured to releasably engage the outer bracket member when the portable camera is in the engaged position relative to the outer bracket member whereby the portable camera is supported by the outer bracket member on an outside of an item such as an article of clothing. The movable retaining member prevents removal of the portable camera from the outer bracket when the movable retaining member is in the engaged position. The inner bracket member and the outer bracket member are configured such that positioning the outer bracket member in the attached position relative to the inner bracket causes the movable retaining member to move into the engaged position such that the portable camera cannot be removed from the outer bracket member when the outer bracket member is in the attached position relative to the inner bracket member.

These and other features, advantages, and objects of the present invention will be further understood and appreciated by those skilled in the art by reference to the following specification, claims, and appended drawings.

BRIEF DESCRIPTION OF THE DRAWINGS

FIG. 1;

DETAILED DESCRIPTION

Figure 1:
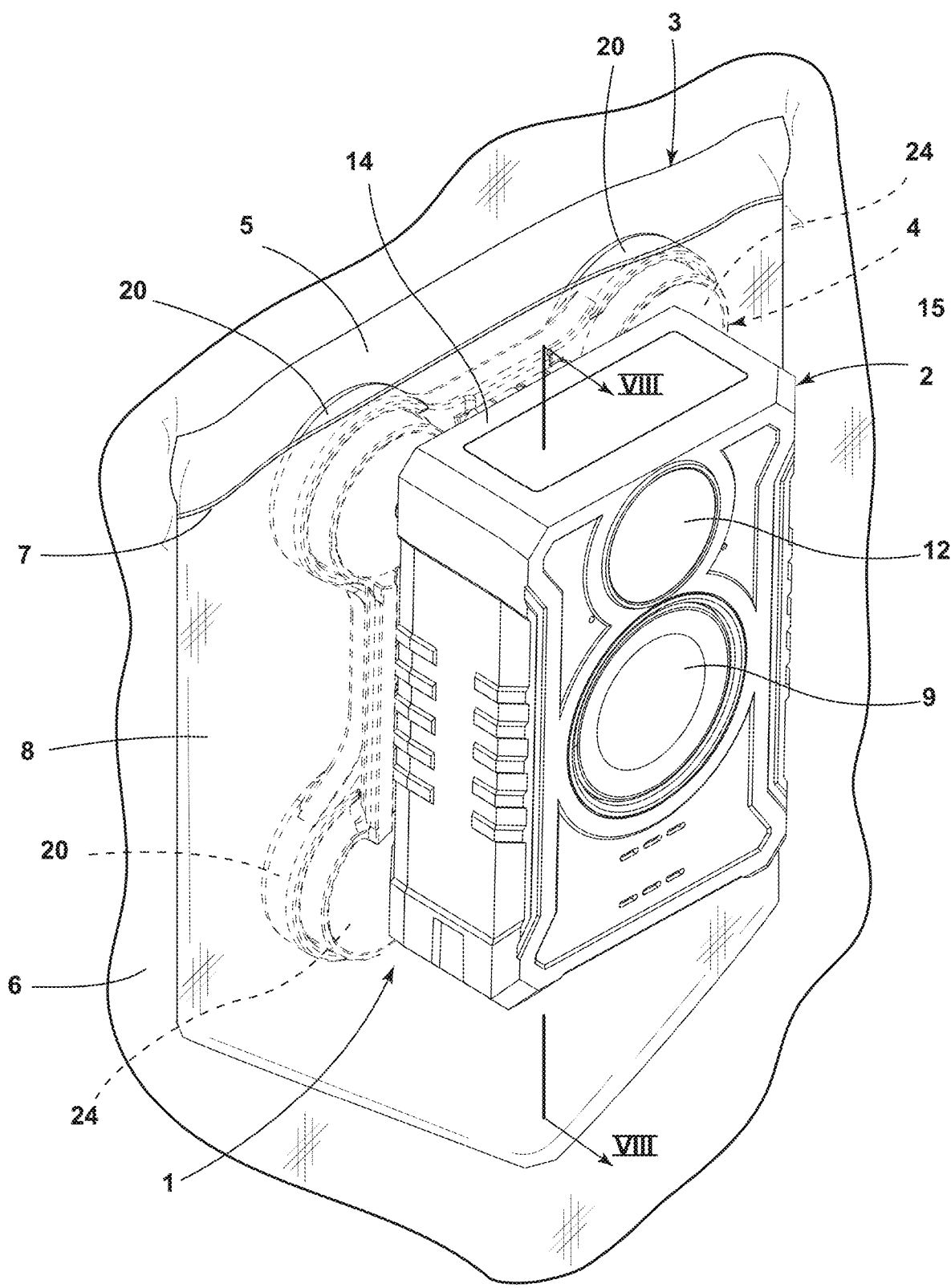
FIG. 1 is a partially fragmentary perspective view of a camera assembly according to an aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
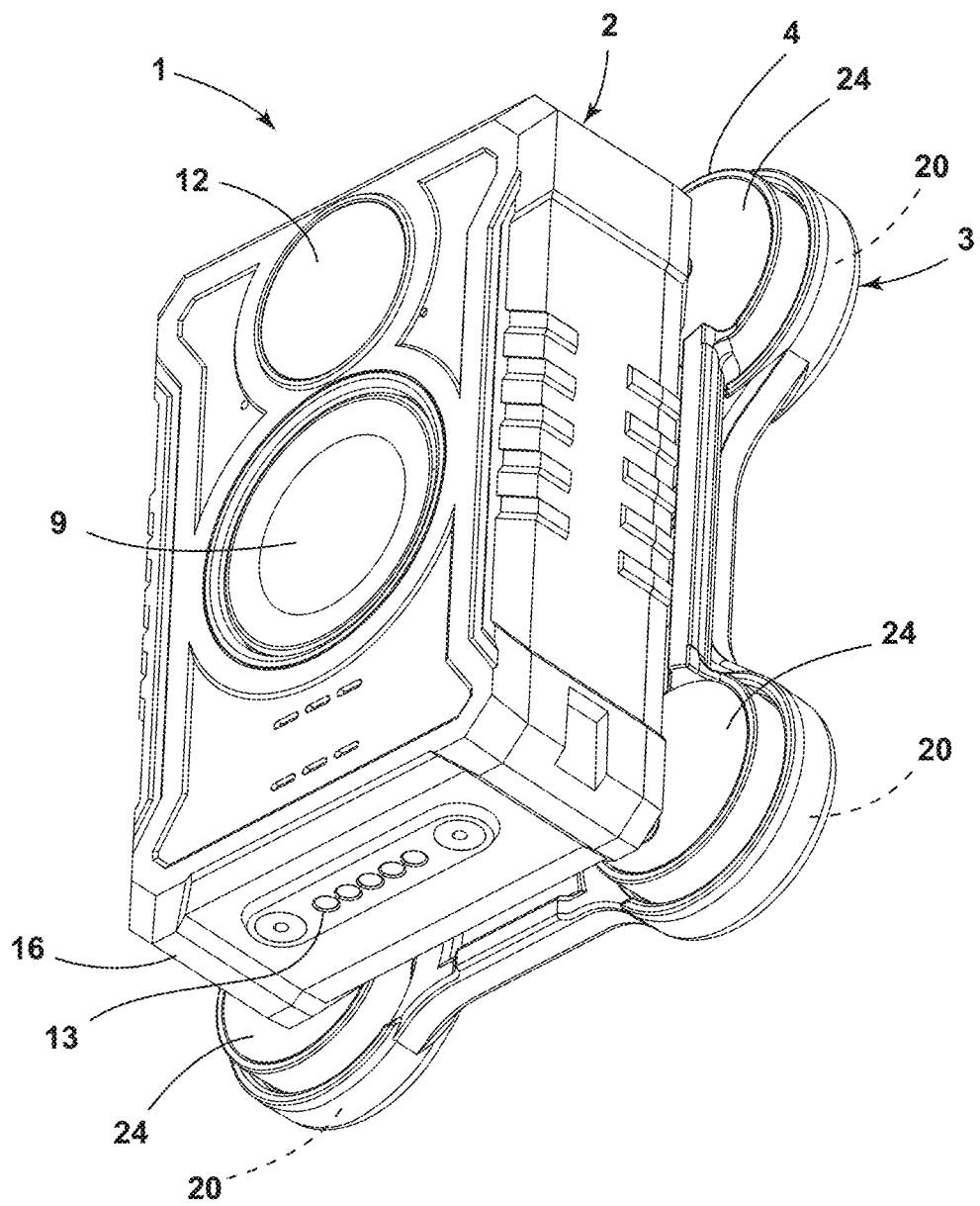
FIG. 2 is a partially fragmentary perspective view of the camera assembly of FIG. 1.
Figure 3:
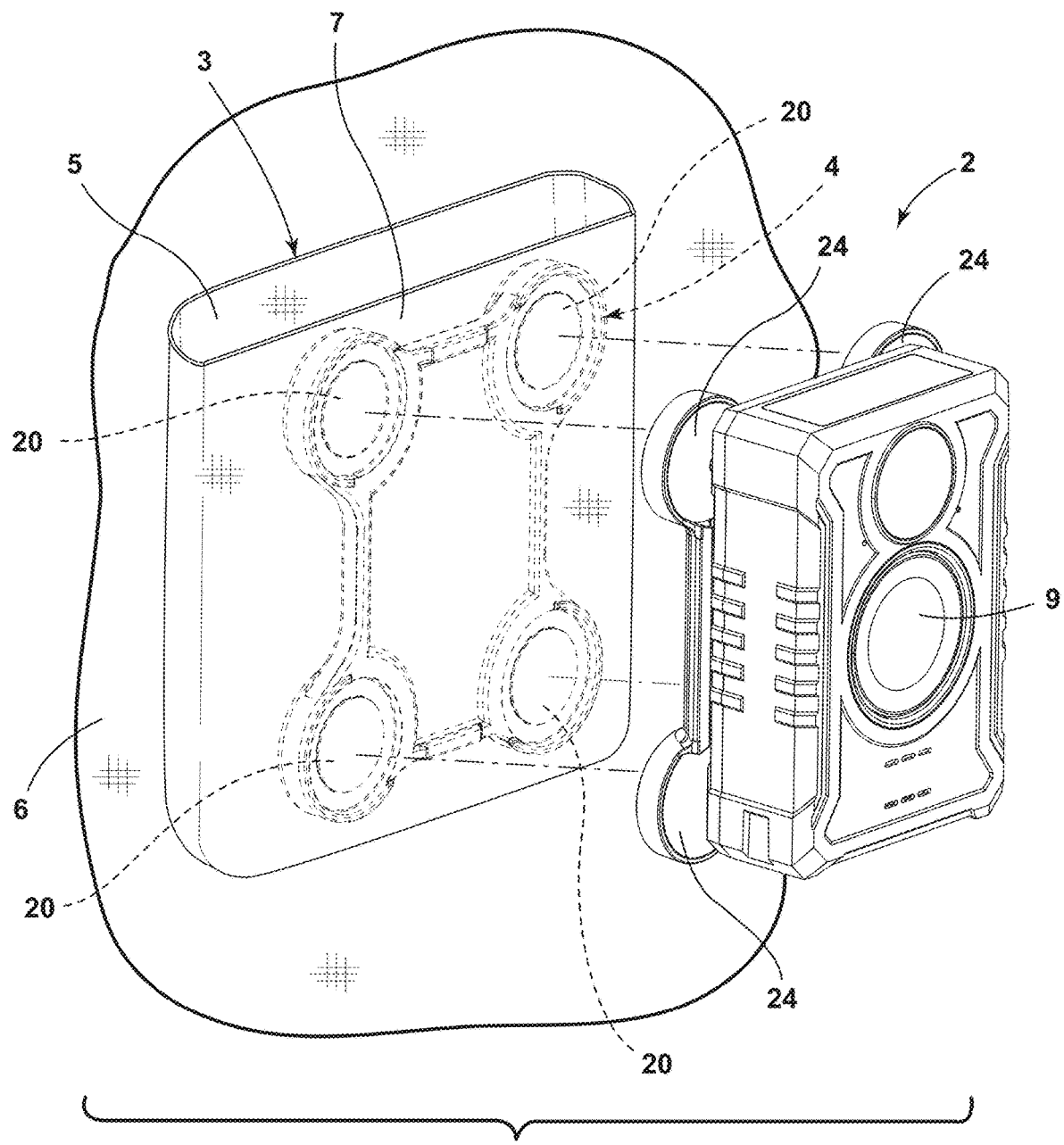
FIG. 3 is a partially fragmentary exploded isometric view of a camera assembly according to an aspect of the present disclosure.

With reference to FIGS. 1 and 2, a camera assembly 1 according to an aspect of the present disclosure includes a portable camera 2 that is adapted to be worn by a user, an inner bracket member 3, and an outer bracket member 4 that is magnetically attracted to the inner bracket member 3. Inner bracket member 3 is optionally configured to fit into a pocket 5 (see also FIG. 3) of an article of clothing 6. In use, the outer bracket member 4 can be retained on an outside 7 of an item such as article of clothing 6 (e.g. pocket 5) by magnetic force acting through a layer of material 8. Layer of material 8 optionally forms the pocket 5, and the outer bracket member 4 may be positioned in an attached position (FIGS. 1 and 2) relative to the inner bracket member 3.

Figure 7:
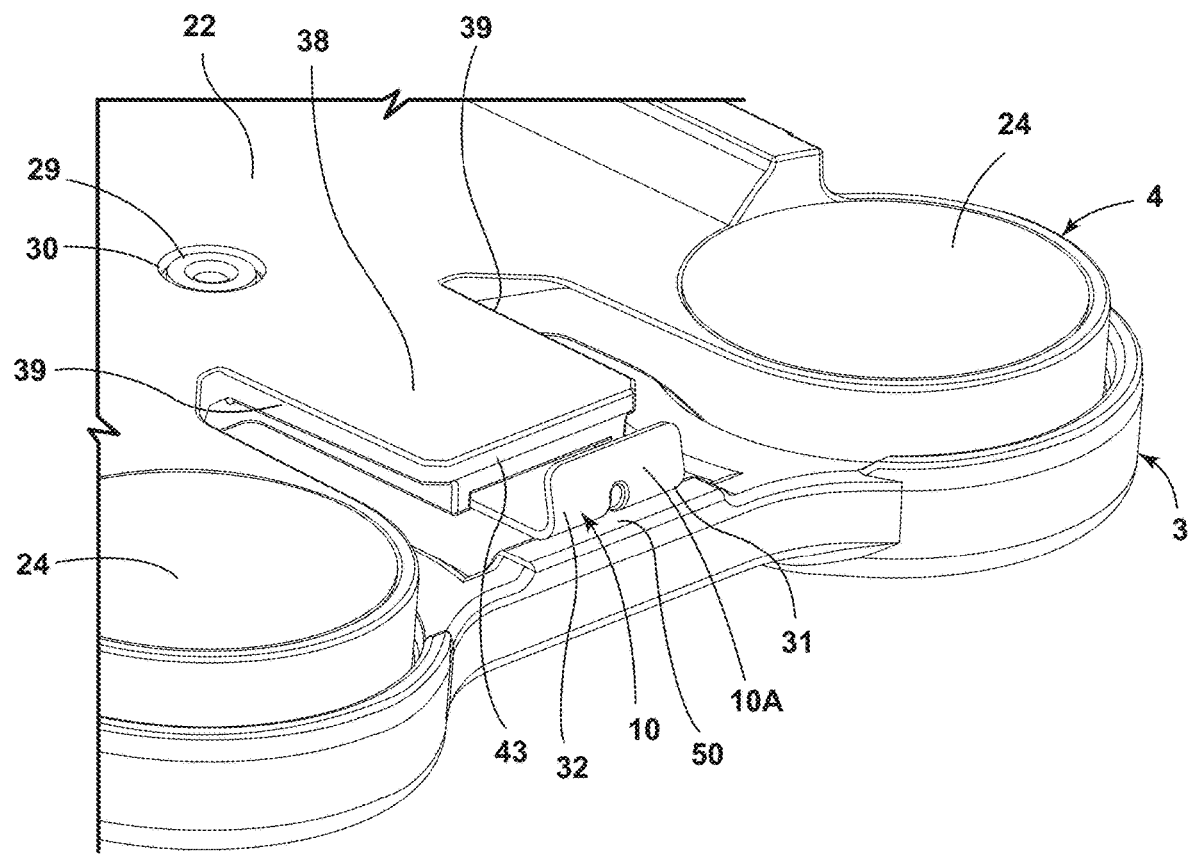
FIG. 7 is a partially fragmentary isometric view of a portion of a camera assembly according to an aspect of the present disclosure.
Figure 8:
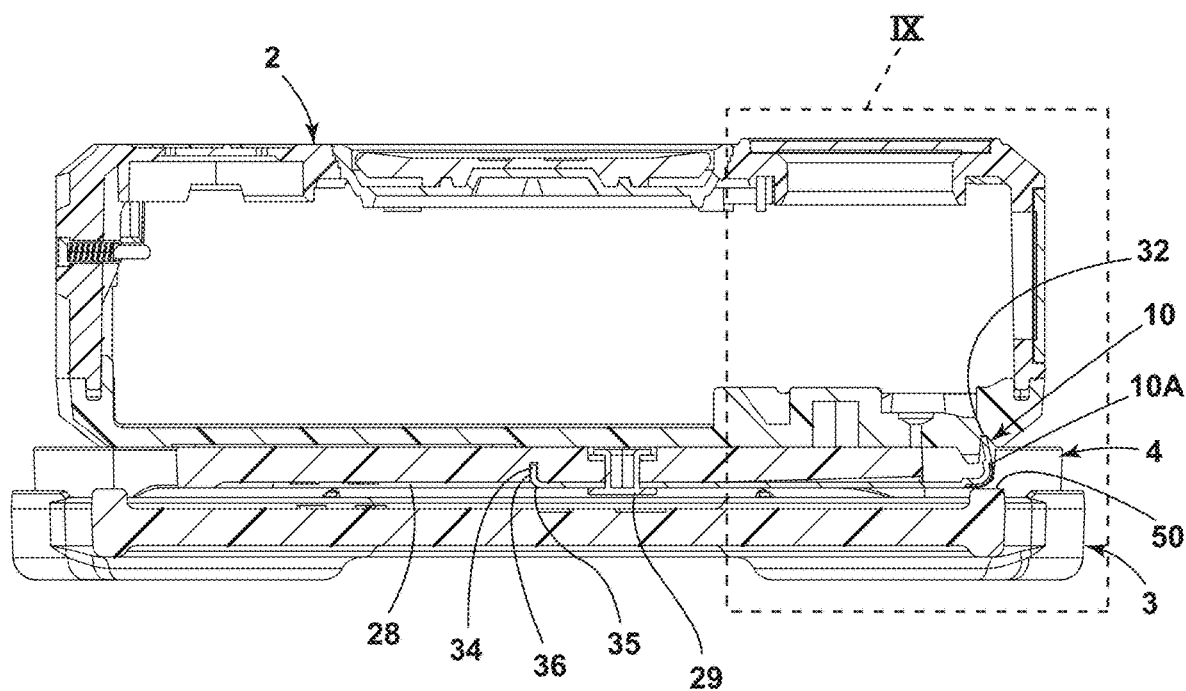
FIG. 8 is a cross sectional view of the camera assembly of FIG. 1 taken along the line VII-VII.
Figure 9:
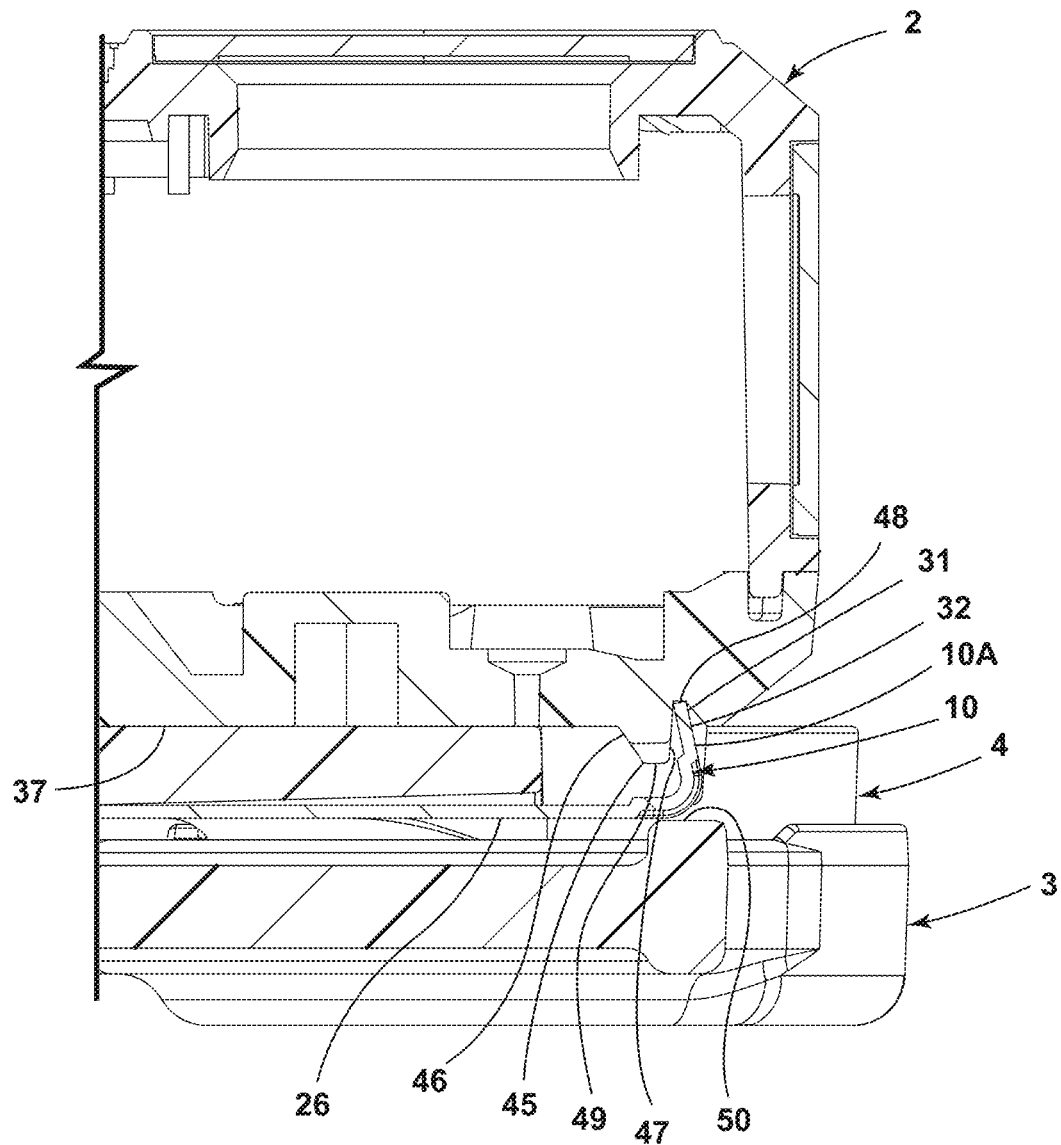
FIG. 9 is a partially fragmentary enlarged cross sectional view of a portion of the camera assembly of FIG. 8.
Figure 10:
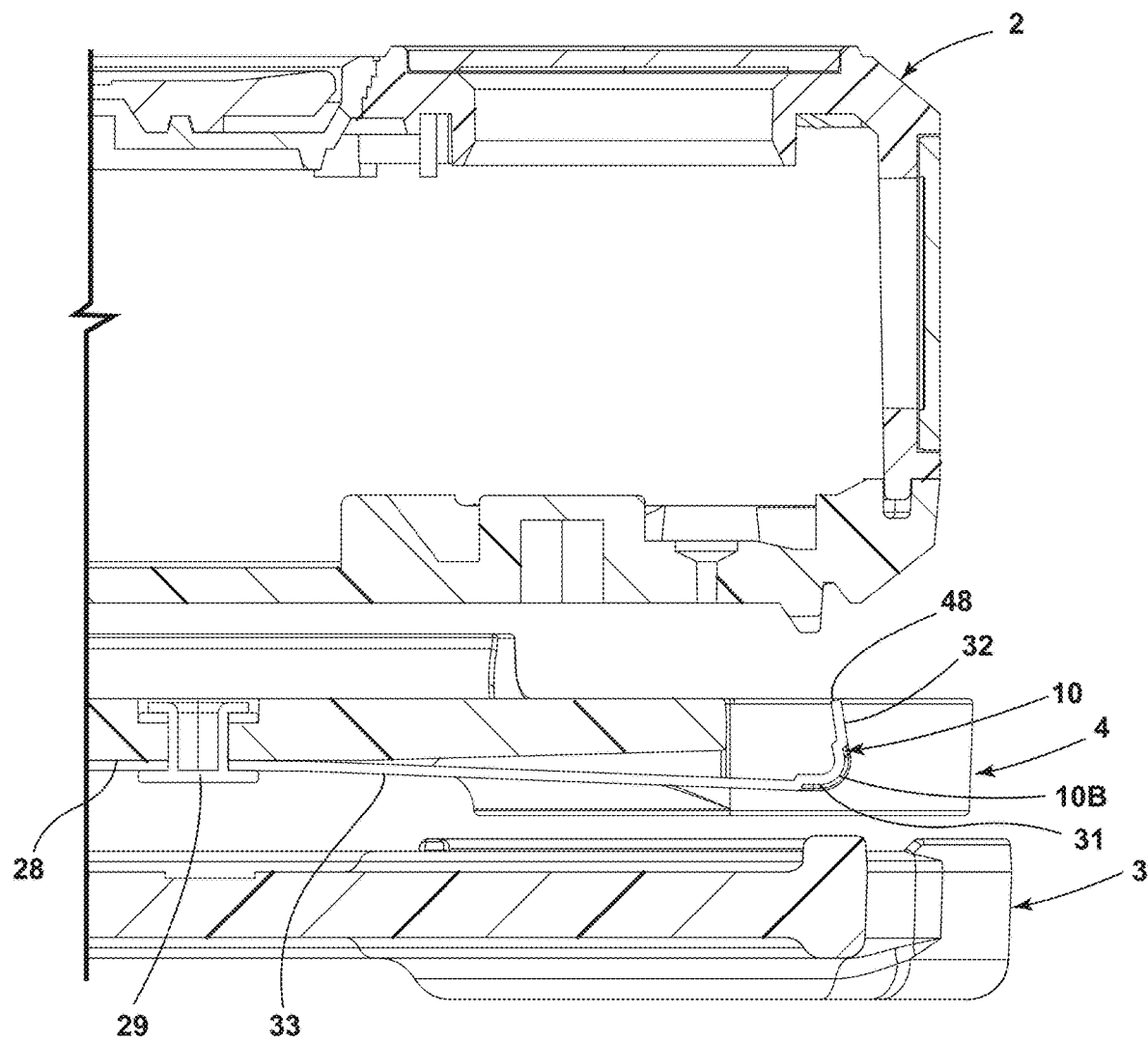
FIG. 10 is a partially fragmentary enlarged view of the camera assembly of FIG. 9 wherein the outer bracket member is spaced apart from the inner bracket member.

A selected one of the portable camera 2 and the outer bracket member 4 includes a movable retaining member 10 (FIGS. 4 and 5) that is movable between an engaged position 10A (FIGS. 7-9) and a disengaged position 10B (FIG. 10). The portable camera 2 is configured to releasably engage the outer bracket member 4 when the portable camera 2 is in an engaged position relative to the outer bracket member 4, whereby the portable camera 2 is supported by the outer bracket member 4 on an outside 7 of an item such as article of clothing 6 (FIG. 1). The movable retaining member 10 prevents removal of the portable camera 2 from the outer bracket member 4 when the movable retaining member 10 is in the engaged position 10A, and the inner bracket member 3 and the outer bracket member 4 are configured such that positioning the outer bracket member 4 in the attached position (e.g. FIG. 1) relative to the inner bracket member 3 causes the movable retaining member 10 to move into the engaged position 10A such that the portable camera 2 cannot be removed from the outer bracket member 4 when the outer bracket member 4 is in the attached position relative to the inner bracket member 3.

Referring again to FIGS. 1 and 2, the portable camera 2 may comprise a BODYCAM® 4 body-worn camera available from Pro-Vision of Byron Center, Michigan. The portable camera 2 may include a lens 12, inner housing member 14, and outer housing member 15. As discussed in more detail below, the portable camera 2 can be detached from the outer bracket member 4, and lower end 16 of portable camera 2 can be positioned in a docking station of a known type (not shown) whereby ports 13 (FIG. 2) engage the docking station to recharge the batteries of the portable camera 2 and/or download recorded video. It will be understood, however, that the present disclosure is not limited to any specific type of portable camera.

Figure 6:
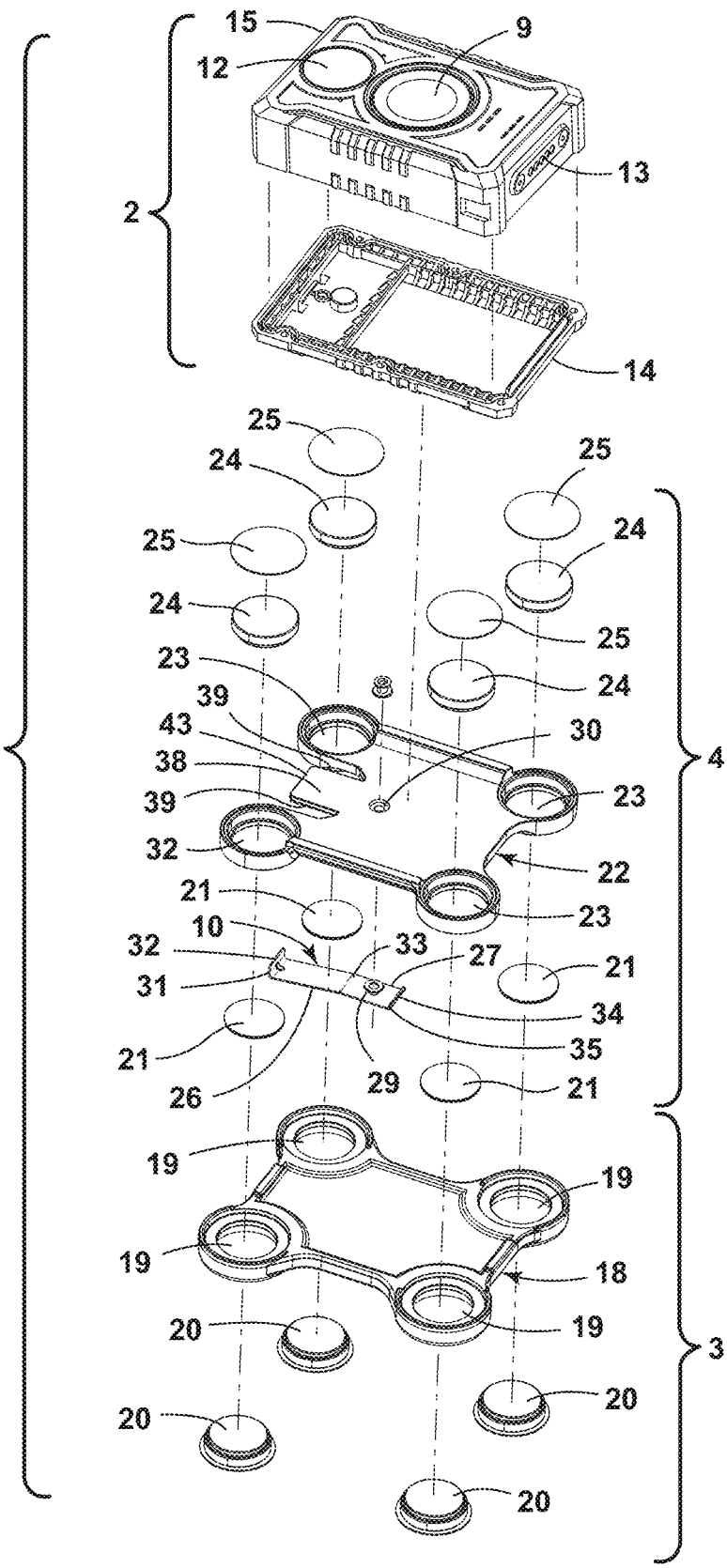
FIG. 6 is an exploded isometric view of a camera assembly according to an aspect of the present disclosure.

With further reference to FIG. 6, inner bracket member 3 may include a bracket body 18 having openings 19 that receive magnets 20 when inner bracket member 3 is assembled. Outer bracket member 4 includes a bracket body 22 with openings 23 that receive magnets 24 when outer bracket member 4 is assembled. Inner bracket member 3 may include disks 21 that are positioned over magnets 20 when inner bracket member 3 is assembled, and outer bracket member 4 may include disks 25 that are positioned over magnets 24 when outer bracket member 4 is assembled. When the outer bracket member 4 is positioned in the attached position relative to the inner bracket member 3 (FIGS. 1 and 2) the magnets 20 and 24 secure the outer bracket member 4 to the inner bracket member 3. If the inner bracket member 3 is positioned on an inner side of a layer of material (e.g. in a pocket 5), the material (e.g. of the pocket) is clamped between the magnets 20 and 24, thereby securing the outer bracket member 4 to an outer side of an article of clothing (e.g. a pocket) with the inner bracket member 3 positioned on an inner side of a layer of material (e.g. inside the pocket). Bracket bodies 18 and 22 may be made from polymer or any suitable material, and retaining member 10 may be made from metal or other suitable material.

The inner bracket member 3 and outer bracket member 4 may be configured such that the magnets 20 of inner bracket member 3 directly contact magnets 24 of outer bracket 4 if the brackets 3 and 4 are brought together without a layer of material between the brackets 3 and 4. The magnets 20 and 24 are preferably sized and configured to provide a secure connection of outer bracket member 4 to inner bracket 3 through a layer of material such that the camera 2 and outer bracket member 4 are not easily dislodged in use. However, the magnetic coupling force may be overcome to remove the outer bracket member 4 by applying a large enough force to the outer bracket member 4 and/or portable camera 2 whereby a user can pull the outer bracket member 4 and portable camera 2 away from the inner bracket member 3 when the camera is no longer required (e.g. at the end of a shift).

It will be understood that the inner bracket member 3 does not need to be positioned in a pocket. Rather, inner and outer brackets 3 and 4 can be positioned with virtually any layer of material between brackets 3 and 4 to position and retain camera 2 in any desired position on virtually any item having a layer of material that can be positioned between brackets 3 and 4.

Referring again to FIGS. 5 and 6, movable retaining member 10 may include an elongated body portion 26 having a base 27 that may be secured to an inner side 28 of body 22 of outer bracket member 4 by a connector 29 that is received in opening 30 of body 22. Connector 29 may comprise a rearward or other suitable fastener. Movable retaining member 10 may include a bend 33 (FIG. 6) whereby end 31 of movable retaining member 10 is spaced downwardly to a disengaged position when outer bracket member 4 is not magnetically coupled to inner bracket member 3 (see also FIG. 10). However, when the outer bracket member 4 is magnetically coupled to the inner bracket member 3 (FIGS. 8 and 9), the end 31 and transverse end tab 32 of movable retaining member 10 are shifted upwardly. Inner end 35 of movable retaining member 10 may include a flange 34 that is received in a groove 36 (FIG. 8) on inner side 28 of bracket member 4 to retain the movable retaining member 10.

Referring again to FIGS. 4 and 5, portable camera 2 may be supported on outer bracket member 4 by a sliding connector that includes a protrusion 38 with opposite side edges 39 that may be slidably received in open ends 40 of grooves 41 formed on a rear side 37 of portable camera 2. Ends 42 of grooves 41 may act as stops whereby end surface 43 of protrusion 38 of outer bracket member 4 engages the ends 42 of grooves 41 of camera 2 when the camera 2 is positioned on the outer bracket member 4. The camera 2 can be attached to the outer bracket member 4 by positioning the camera 2 in contact with outer bracket member 4 with the protrusion 38 directly adjacent the open ends 40 of grooves 41, and the camera 2 can then be slid downwardly such that the protrusion 38 is received in the space 44 between grooves 41, with side edges 39 of protrusion 38 received in grooves 41.

Referring again to FIG. 4, camera 2 may include a protrusion 45 that may be in the form of a ridge having first and second opposite sides 46 and 47 (see also FIG. 9). The side 46 may be disposed at an angle to form a sliding cam surface whereby the edge 48 of transverse end tab 32 contacts angled surface 46 as camera 2 is installed on outer bracket member 4 if camera 2 is installed while outer bracket member 4 is magnetically coupled to inner bracket 3. As shown in FIG. 9, the transverse end tab 32 of movable retaining member 10 may be disposed at an angle that is less than 90° relative to the body 26 of movable retaining member 10 to facilitate sliding engagement of end tab 32 of movable retaining member 10 along angled opposite side 46 of protrusion 46. As the camera 2 is seeded in a fully installed position on outer bracket member 4, the edge 48 of movable retaining member 10 slides over end surface 49 of protrusion 45 of camera 2, and the transverse end tab 32 then moves into position adjacent second opposite side 47 of protrusion 45 due to the bias of movable retaining member 10 towards the engaged position caused by contact between movable retaining member 10 and surface 50 of inner bracket member 3 when inner bracket member 3 is magnetically coupled to outer bracket member 4.

Referring again to FIG. 3, in use, portable camera 2 can be connected to outer bracket member 4 before the outer bracket member 4 is connected to the inner bracket member 3. The inner bracket member 3 can be positioned on one side of a layer of material 8 (e.g. in a pocket 5 of an article of clothing 6), and the outer bracket member 4 can then be brought into engagement with inner bracket member 3 whereby the magnets 20 and 24 of inner bracket member 3 and outer bracket member 4, respectively, clamp the layer of material 8 between the magnets 20 and 24. The magnets 20 and 24 thereby securely retain the portable camera 2 and outer bracket member 4 on an outer side of the item (e.g. on outer side of pocket 5).

As discussed above, magnetically coupling the inner and outer brackets 3 and 4 causes the movable retaining member 10 to flex into an engaged position (FIG. 9) in which the movable retaining member 10 prevents detachment of portable camera 2 from outer bracket member 4. It will be understood that the movable retaining member 10 and protrusion 45 (FIG. 9) may be configured such that the portable camera 2 can be dislodged from outer bracket member 4 when the outer bracket member 4 is magnetically coupled to the inner bracket member 3 if a sufficiently large force is applied to the portable camera 2. Thus, although the movable retaining member 10 may be configured to require a significantly increased force acting on portable camera 2 to detach portable camera 2 from outer bracket member 4, this force may comprise a detent force that is sufficient to prevent inadvertent dislodgement of portable camera 2 from outer bracket member 4 when outer bracket member 4 is magnetically coupled to inner bracket member 3, but wherein the detent force does not completely prevent dislodgement of portable camera 2 from outer bracket member 4 when outer bracket member 4 is magnetically coupled to inner bracket member 3 through a layer of material or the like.

Figure 4:
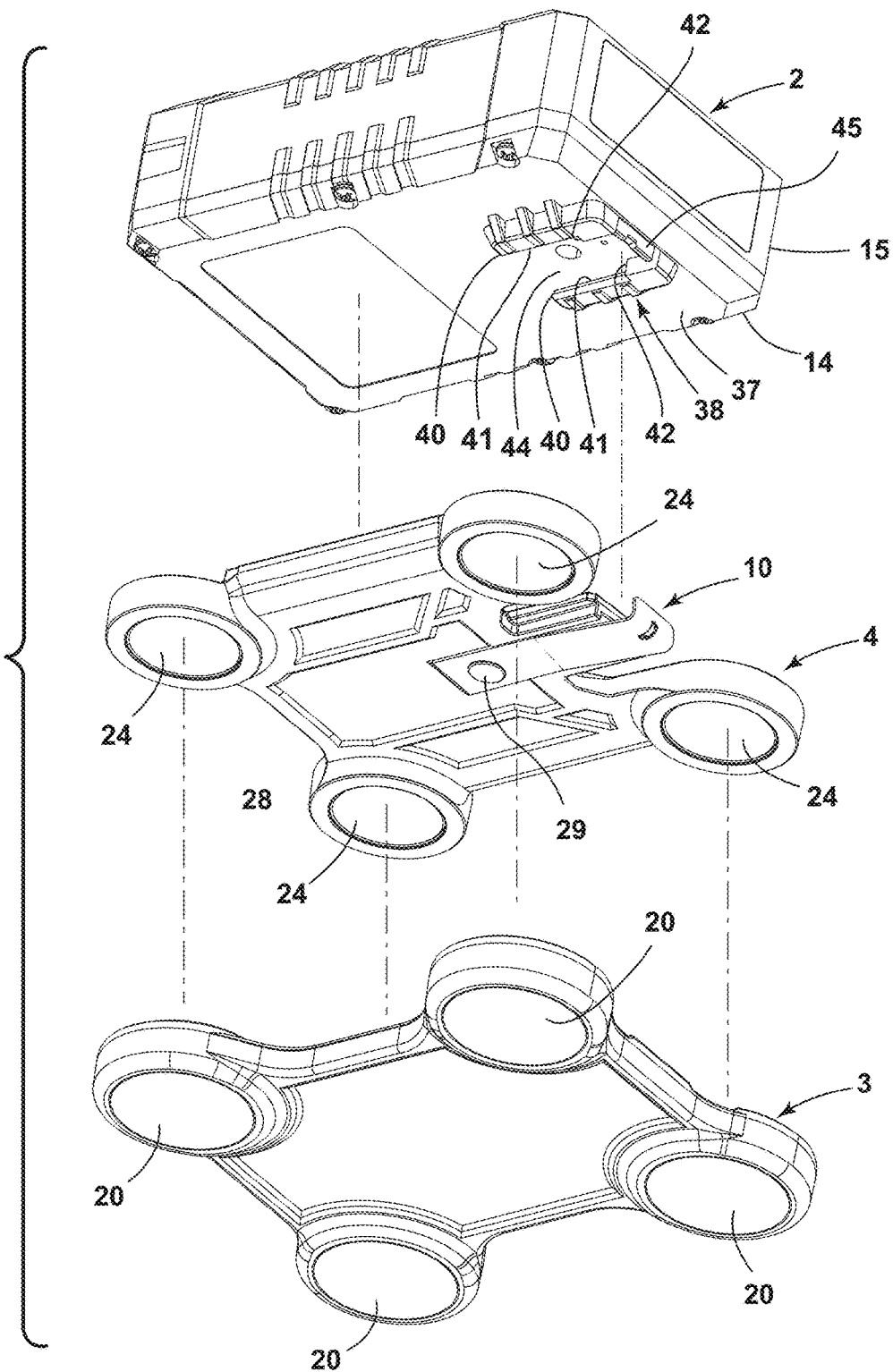
FIG. 4 is a partially exploded isometric view of a camera assembly according to an aspect of the present disclosure.
Figure 5:
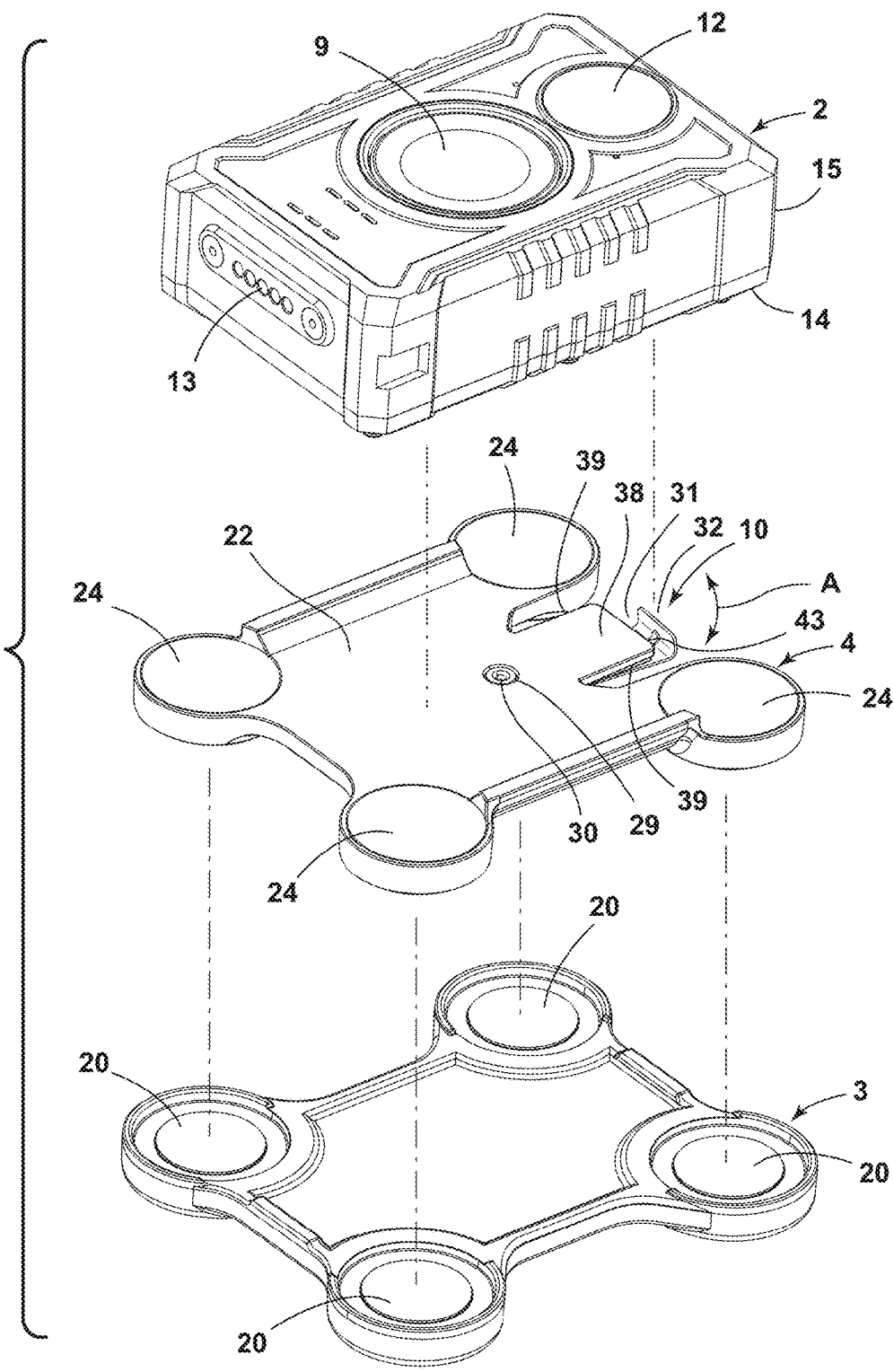
FIG. 5 is a partially exploded isometric view of a camera assembly according to an aspect of the present disclosure.

The portable camera 2 can be removed by applying a force to outer bracket member 4 that is sufficient to overcome the magnetic force of magnets 20 and 24, and the camera 2 and outer bracket member 4 can then be moved away from the inner bracket member 3 while the inner bracket member 3 is on an inside of a layer of material (e.g. inside the pocket 5). The portable camera 2 can then be grasped and moved relative to outer bracket member 4 to disengage the protrusion 38 (FIG. 7) from grooves 41 (FIG. 4). The portable camera 2 can then be positioned in a docking station or the like (not shown) with ports 13 (FIG. 5) engaging the docking port.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A wearable portable camera assembly comprising:
an inner bracket;
an outer bracket that can be magnetically coupled to the inner bracket through a layer of material;
a portable camera releasably connected to the outer bracket;
a retainer, wherein the retainer is configured to resist detachment of the portable camera from the outer bracket when the outer bracket is magnetically coupled to the inner bracket, and wherein the retainer is configured to permit detachment of the portable camera from the outer bracket when the outer bracket is not magnetically coupled to the inner bracket;
a sliding connecting structure that permits the portable camera to be connected to the outer bracket by sliding the portable camera into engagement with the outer bracket, wherein a stop structure limits movement of the portable camera when the portable camera is in an engaged position relative to the outer bracket;
wherein the sliding connecting structure comprises a pair of spaced apart channels on a rear side of the portable camera, wherein the channels face each other and have an open end, the sliding connecting structure further comprising a rigid tab on the outer bracket, the rigid tab having opposite side edges, and wherein the opposite side edges are received in the open ends of the channels as the portable camera is connected to the outer bracket to retain the portable camera on the outer bracket in the engaged position;
wherein the rigid tab includes an end surface extending between the opposite side edges;
wherein the tab of the retainer is spaced apart from the end surface of the rigid tab to form a gap when the portable camera is in the engaged position on the outer bracket and the retainer is in the engaged position;
and wherein the portable camera includes a protrusion that is disposed in the gap whereby the tab of the retainer engages the protrusion to prevent removal of the portable camera from the outer bracket when the portable camera is in the engaged position relative to the outer bracket and the outer bracket is magnetically coupled to the inner bracket.

2. The wearable portable camera assembly of claim 1, wherein:
the movable retaining member is biased towards the disengaged position.

3. The wearable portable camera assembly of claim 2, wherein:
the movable retaining member is secured to the outer bracket member.

4. The wearable portable camera assembly of claim 3, wherein:
the movable retaining member contacts the inner bracket member when the outer bracket member is in the attached position relative to the inner bracket member whereby the contact of the movable retaining member with the inner bracket member causes the movable retaining member to remain in the engaged position.

5. The wearable portable camera assembly of claim 4, wherein:
the movable retaining member comprises a flexible member having a base that is fixed to the outer bracket member and a distal end having a transverse tab that is configured to be moved to an engaged position when the flexible member contacts the inner bracket member.

6. The wearable portable camera assembly of claim 5, wherein:
the portable camera is configured to slidably engage the outer bracket member whereby the portable camera can be slidably moved from a disengaged position relative to the outer bracket member into the engaged position relative to the outer bracket member by moving the portable camera.

7. The wearable portable camera assembly of claim 6, wherein:
the portable camera includes a rear side that faces the outer bracket member when the portable camera is in the engaged position relative to the outer bracket member, and a retaining surface that is transverse to the rear side, and wherein the transverse tab of the flexible member engages the retaining surface and prevents movement of the portable camera from the engaged position when the outer bracket member is in the attached position relative to the inner bracket member.

8. The wearable portable camera assembly of claim 7, wherein:
the portable camera includes an angled ramp surface facing away from the retaining surface whereby movement of the portable camera towards the engaged position relative to the outer bracket member causes the transverse tab of the flexible member to slide along the ramp surface and move the transverse tab away from the engaged position whereby the portable camera can be moved to the engaged position relative to the outer bracket member when the outer bracket member is in an attached position relative to the inner bracket member.

9. The wearable portable camera assembly of claim 8, wherein:
the retaining surface and the ramp surface are formed by opposite surfaces of a ridge projecting from the rear side of the portable camera.

10. A wearable portable camera assembly comprising:
an inner bracket;
an outer bracket that can be magnetically coupled to the inner bracket through a layer of material;
a portable camera releasably connected to the outer bracket;
a retainer, wherein the retainer is configured to resist detachment of the portable camera from the outer bracket when the outer bracket is magnetically coupled to the inner bracket, and wherein the retainer is configured to permit detachment of the portable camera from the outer bracket when the outer bracket is not magnetically coupled to the inner bracket.

11. The wearable portable camera assembly of claim 10, wherein:
the retainer is movable to an engaged position in which the retainer resists detachment of the portable camera from the outer bracket and a disengaged position in which the retainer does not resist detachment of the portable camera from the outer bracket;
moving the outer bracket towards the inner bracket and magnetically coupling the outer bracket to the inner bracket through a layer of material moves the retainer from the disengaged position to the engaged position.

12. The wearable portable camera assembly of claim 11, wherein:
moving the outer bracket away from the inner bracket causes the retainer to move from the engaged position to the disengaged position.

13. The wearable portable camera assembly of claim 12, wherein:
the retainer is biased towards the disengaged position.

14. The wearable portable camera assembly of claim 13, wherein:
the retainer comprises a resilient member fixed to a selected one of the portable camera and the outer bracket.

15. The wearable portable camera assembly of claim 14, wherein:
the retainer includes a first portion that is fixed to the outer bracket and a second portion that engages the portable camera when the retainer is in the engaged position.

16. The wearable portable camera assembly of claim 15, wherein:
the first portion of the retainer comprises a bendable body, and the second portion comprises a tab that is transverse to the bendable body.

* * * * *